Sept. 2, 1969 E. F. FLINT 3,465,149
THERMAL DETECTION SYSTEM
Filed July 11, 1966 2 Sheets-Sheet 1

INVENTOR.
EDWARD F. FLINT
BY Edward Dugas
AGENT

Sept. 2, 1969          E. F. FLINT          3,465,149
THERMAL DETECTION SYSTEM
Filed July 11, 1966                    2 Sheets-Sheet 2

INVENTOR.
EDWARD F. FLINT
BY
*Edward Dugas*
AGENT

United States Patent Office 3,465,149
Patented Sept. 2, 1969

3,465,149
THERMAL DETECTION SYSTEM
Edward F. Flint, Fullerton, Calif., assignor to North
American Rockwell Corporation
Filed July 11, 1966, Ser. No. 565,351
Int. Cl. G01t 1/16
U.S. Cl. 250—83.3        8 Claims

ABSTRACT OF THE DISCLOSURE

A thermal detection system comprising an infrared detector which is enclosed in a liquid tight housing having an infrared radiation transparent window oriented to permit incoming radiation to be focused on the detector assembly. Radiation from a reference blackbody and incoming radiation is alternately measured by the detector assembly.

---

This invention relates to a thermal detection system and more specifically to an infrared thermal detection system which may be moved at relatively high rates of speed through a liquid while providing accurate measurements of changes in the temperature of the liquid.

Various methods and devices have been used in the past to detect temperature variations within the oceans and other large bodies of water. One such device is an infrared radiometer which is flown over the area to be measured to detect surface temperature differentials.

One of the prime disadvantages to this type of device is that it must be used at night due to the background radiation of sunlight on the surface.

Another prior art device utilizes temperature sensitive elements, such as platinum resistance films, which are moved through the water at relatively high rates of speed (3 knots or more). The problem associated with this type of device is that the sea water, at these speeds, causes damage by abrasion and corrosion to the resistive films. When these devices are protected from sea water contact their sensitivity becomes greatly impaired.

In one embodiment of the present invention, a window, which is transparent to infrared radiation, is positioned on one end of a hollow watertight probe. Within the probe is an optical system for focusing the radiation from a thin film of water in contact with the outer surface of the window on an infrared detecting element. The need for mechanical or electrical components being in contact with the water is thereby eliminated.

It is, therefore, an object of the present invention to provide a new and improved thermal detection system.

Another object of the present invention is to provide a thermal detection system of high sensitivity which may be propelled or towed through a fluid at relatively high rates of speed.

Still another object of the present invention is to provide a thermal detection system which retains its high sensitivity while still being impervious to the corrosion and abrasion effects of fluid flow.

Another object of the present invention is to provide an infrared thermal detector which operates underwater.

These and other objects of this invention will become more apparent from the following description taken in conjunction with the accompanying drawings in which.

Figure 1:
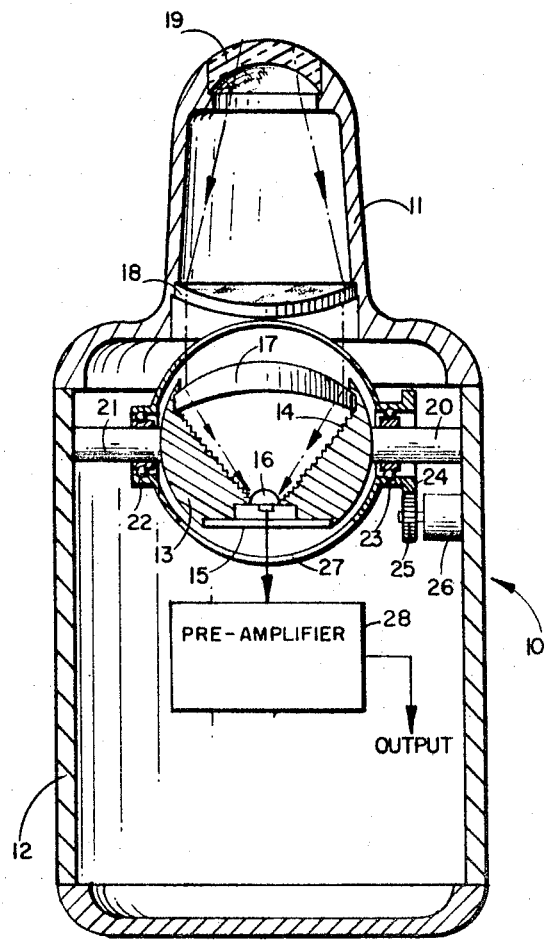
FIG. 1 illustrates a cross sectional view of a preferred embodiment of the present invention.
Figure 2:
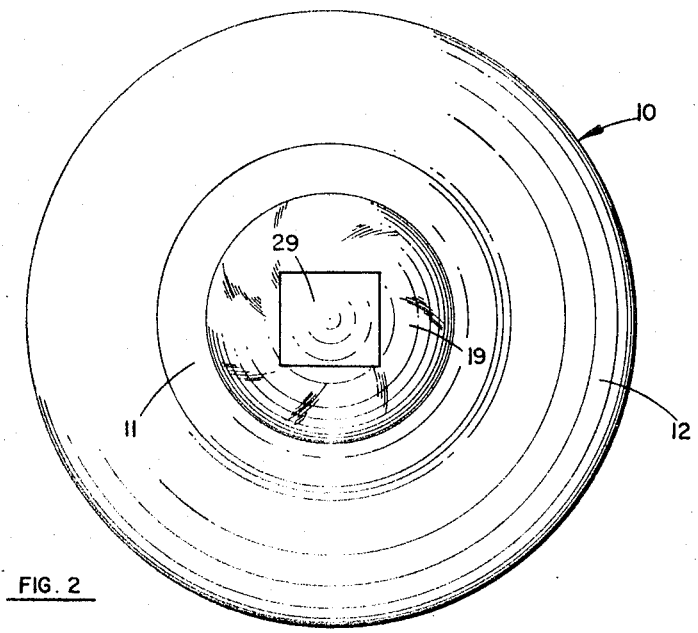
FIG. 2 is a full top end view of the embodiment shown in FIG. 1.

Referring to FIGS. 1 and 2, the thermal detection system 10 is housed within a probe head assembly 11 and a probe tail assembly 12. Mounted to one end of the probe head 11 is a partial hemispherical window 19 which is transparent to infrared rays. The probe head 11 is mated with the window 19 such that the outer surface of the probe head 11 in conjunction with the window 19 completes the full hemispheric shape of the probe head 11. Mounted to the other end of the probe head 11 is an objective relay lens 18. The probe tail 12 is mounted to the probe head 11 so as to form, in conjunction with window 19, a watertight unit.

Within the probe tail 12 is an infrared detector assembly 15 which is mounted on a spherically shaped housing assembly 13 having a conically shaped black body reference surface 14 with a relatively small circular aperture at the detector end and a relatively large circular aperture at the opposite end. The detector assembly 15 including a detector element 16 is mounted in the relatively small aperture. A circular collimator or objective lens 17 is mounted in the larger circular aperture. The housing assembly 13 is mounted to the body of the probe tail 12 by means of shafts 20 and 21. Bearings 22 and 23 rotatably mount a spherical chopper 27 to the shafts 20 and 21. A gear 24 is fixed to the outer race of bearing 23 which in turn is fixed to the chopper 27. Motor 26, fixed to a wall of assembly 12, rotates gear 24, and in turn chopper 27 via the gear 25. The rotation of the chopper 27 will result in alternating periods during which the detector element 16 will be exposed to radiation from the window 19 and periods during which radiation is reflected back from the black body surface 14. A more detailed description of the operation of the spherical chopper appears in my copending application, Ser. No. 401,126, entitled "Radiometer," filed Oct. 2, 1964 now Patent No. 3,350,562. A temperature regulator may be incorporated into the black body so as to maintain its temperature at some predetermined constant value. The chopper 27 and black body 14 may be eliminated in those applications where it is not required to reference incoming radiation against a reference source. Such an application would exist when only sharp changes in an ambient liquid flow are to be detected.

The output from the infrared detector assembly 15 is fed to a preamplifier 28, the output of which may be fed to a recorder or visual indicators (not shown) for further processing.

The square shaded area 29 (FIG. 2) corresponds to the area of the film of water, the radiation from which is to be sensed.

The operation of the thermal detection system with respect to underwater ocean temperature sensing will now be discussed.

The underwater temperatures in the ocean range from

−2 degrees through 35 degrees centigrade (ref. "The Oceans" by Sverdrup, Johnson and Fleming, Prentice Hall, 1942). Infrared radiation levels from sea water within this temperature range can be determined by using the Planck formula $$\int_0^\infty F\lambda d\lambda = \frac{2\pi^5 K^4 T^4}{15 C^2 h^3}$$

where:
$F\lambda$=watts/m.$^2$/micron
T=degrees Kelvin
$\lambda$=wavelength in microns
$h$=Planck's constant
C=velocity of light in feet per second
K=Boltzmann's constant Using the above formula with the range of values given for the ocean temperatures, it can be shown that $F\lambda$ has a pronounced maximum of $\lambda_m$. From Wien (ref: The Detection and Measurement of Infrared Radiation by R. A. Smith, F. E. Jones and R. P. Chasmer, Oxford at the Clarendon Press, 1957), the maximum wavelength of infrared radiation in microns may be determined from:

$$\lambda_m = \frac{2898}{273 \text{ deg.} + C}$$

where C is the velocity of light. To design a detection system having maximum sensitivity to these wavelength values, the maximum radiation wavelengths can be computed for any given sea water temperature. For example:

At 0° C., the maximum wavelength of $\lambda_m$=10.6 microns
At 7° C., the maximum wavelength of $\lambda_m$=10.3 microns
At 30° C., the maximum wavelength of $\lambda_m$=9.6 microns The transmittance of infrared by water has been measured by the U.S. Bureau of Standards (ref: "Infrared Absorption of Water From 2 to 4 Microns," E. K. Plyler and N. Acquista, Journal of Optical Society of America, volume 44, No. 6, June 1954) and is given in the following table:

TRANSMITTANCE IN PERCENT

| Water thickness | Maximum Wavelength, m. | | |
|---|---|---|---|
| | 9.6 | 10.3 | 10.6 |
| 0.0002 in. (0.005 mm.) | 80 | 65 | 60 |
| 0.0004 in. (0.010 mm.) | 52 | 45 | 40 |
| 0.0012 in. (0.030 mm.) | 19 | 8 | 5 |

From the above information, it has been determined that underwater radiation from the ocean is best determined from a film not greater than 0.001 in. in thickness.

Figure 3:
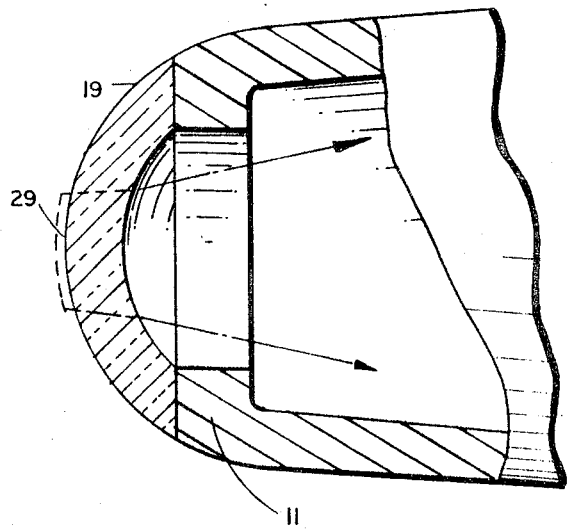
FIG. 3 is an enlarged view of a segment of the embodiment of FIG. 1.

Referring now to FIG. 3 in conjunction with FIGS. 1 and 2, the optical image 29 of a film of water on the outer surface of the window 19 is refracted through the two objective lenses 18 and 17, and then to the infrared detector assembly 15. The main purpose of the optical amplification system is to pick up both the largest area of radiation at the window front surface and to relay the resulting radiation onto as small a detector area as reasonable using as large a solid angle as possible thereby improving the detectors signal-to-noise ratio. The objective lenses 18 and 17 are of the meniscus type and are separated so as to permit the placement of the mechanical spherical chopper 27 between them. If the chopper is not used, the lenses 18 and 17 may be combined to form one lens. The detector assembly 15 may be of the aplanat type disclosed in my copending patent application Ser. No. 402,063, filed Oct. 2, 1964, now Patent No. 3,368,078 entitled "Radiant Energy Detector."

The detector element 16 may be a thermistor bolometer which produces an output signal proportional to the input infrared radiation focused upon it. Bolometers are essentially resistance thermometers, either platinum strips or metal oxides. Two are generally mounted close together so as to be nearly as possible at the same temperature. Each of the bolometers may be placed in an arm of a bridge network such that radiation incident on the exposed bolometer causes the bridge to be unbalanced, providing an output signal proportional to incident radiation.

Lenses 17, 18 and 19 in an embodiment of the invention reduced to practice were fabricated from a zinc sulfide refractive material called Irtran-2 manufactured by Eastman Kodak Company.

The window 19, as shown in the drawings, has its outer surface shaped as a partial hemisphere. It is possible to use other shapes such as a cone, or truncated cone, although such shapes may cause undesirable flow over the surface of the window which may degrade the quality of the radiation.

Although this invention has been described and illustrated in detail, it is to be clearly understood that the same is by way of illustration and example only and is not to be taken by way of limitation, the spirit and scope of this invention being limited only by the terms of the appended claims.

I claim:
1. A detection system comprising:
   means for detecting infrared radiation, and
   means for focusing the infrared radiation emissions of a thin film of fluid upon said infrared radiation detecting means.
2. A detection system comprising in combination:
   (a) means for detecting infrared radiation;
   (b) means for focusing the radiation emissions from a thin film of fluid on said infrared detecting means;
   (c) a blackbody source;
   (d) chopper means for alternately focusing the radiation from said blackbody source and said thin film of fluid on said infrared radiation detecting means.
3. The detection system of claim 1 and further comprising: an infrared window in contact with said fluid, said window substantially transparent to infrared radiation wherein said focusing means focuses the infrared radiation emissions of said film of fluid in contact with said window upon said infrared radiation detecting means.
4. A detection system comprising in combination:
   (a) means for detecting infrared radiation;
   (b) means for focusing the radiation emitted from a thin film of fluid upon said infrared radiation detecting means;
   (c) an infrared window in contact with said fluid, said window substantially transparent to infrared radiation wherein said focusing means focuses the radiation emitted by said thin film of fluid in contact with said window upon said infrared radiation detecting means; and
   (d) wherein said focusing means, and said infrared radiation detecting means are housed within a liquid tight probe assembly with said infrared window forming a portion of the wall of said probe assembly.
5. A detection system comprising in combination:
   (a) means for detecting infrared radiation;
   (b) means for focusing the radiation emitted from a thin film of fluid upon said infrared radiation detecting means;
   (c) an infrared window in contact with said fluid, said window being substantially transparent to infrared radiation wherein said focusing means focuses the radiation from said film of fluid in contact with said window upon said infrared radiation detecting means; and
   (d) wherein the surface of said infrared window in contact with said liquid is spherically shaped.
6. The detection system of claim 3 wherein said focusing means is comprised of a first objective lens, a second objective lens and said system further comprises:
   a chopper means for interrupting the radiation focused on said infrared detection means, said chopper means positioned between said first and said second objective lenses.
7. The detection system of claim 4 wherein said focus- ing means is comprised of a first objective lens, a second objective lens and said system further comprises:
  a chopper means for interrupting the radiation focused on said infrared detection means, said chopper means positioned between said first and said second objective lenses.

8. The detection system of claim 5 wherein said focusing means is comprised of a first objective lens, a second objective lens and said system further comprises:
  a chopper means for interrupting the radiation focused on said infrared detection means, said chopper means positioned between said first and said second objective lenses.

References Cited
UNITED STATES PATENTS

| | | | |
|---|---|---|---|
| 3,039,006 | 6/1962 | Weiss | 250—83.3 X |
| 3,153,724 | 10/1964 | Demorest | 250—43.5 X |
| 3,307,039 | 2/1967 | Aemmer | 250—83.3 |

RALPH G. NILSON, Primary Examiner

D. L. WILLIS, Assistant Examiner

U.S. Cl. X.R.

73—355; 250—43.5